United States Patent
Pavacic et al.

(10) Patent No.: US 9,667,279 B2
(45) Date of Patent: May 30, 2017

(54) SYSTEMS AND METHODS FOR A UNIVERSAL ANTENNA MODULE

(71) Applicant: Google Technology Holdings LLC, Mountain View, CA (US)

(72) Inventors: Andrew Pavacic, Mundelein, IL (US); Alejandro Candal, Davie, FL (US); Jose Gonzalez, Miami, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 507 days.

(21) Appl. No.: 14/136,973

(22) Filed: Dec. 20, 2013

(65) Prior Publication Data

US 2015/0180514 A1 Jun. 25, 2015

(51) Int. Cl.
- *H04B 1/00* (2006.01)
- *H04B 1/04* (2006.01)
- *H04B 1/18* (2006.01)

(52) U.S. Cl.
CPC ......... *H04B 1/0064* (2013.01); *H04B 1/0458* (2013.01); *H04B 1/18* (2013.01)

(58) Field of Classification Search
CPC ............... H04W 28/065; H04W 52/04; H04W 72/1242; H04W 88/06; H04L 47/10; H04L 47/14; H04L 47/24
USPC .......... 455/552.1, 575.1, 78, 277.2; 343/702, 343/745
See application file for complete search history.

(56) References Cited

U.S. PATENT DOCUMENTS

| | | | | |
|---|---|---|---|---|
| 8,350,763 B2 * | 1/2013 | Rappaport | ............. | H01Q 1/243 343/702 |
| 2005/0245202 A1 * | 11/2005 | Ranta | ...................... | H04B 1/48 455/78 |
| 2008/0136729 A1 * | 6/2008 | Kang | ...................... | H04B 1/18 343/861 |
| 2010/0304785 A1 * | 12/2010 | Marlett | .................. | H01Q 1/243 455/552.1 |

(Continued)

OTHER PUBLICATIONS

Ifixit, "iPhone 4 Teardown", http://www.ifixit.com/Teardown/iPhone+4+Teardown/3130, Jun. 22, 2010, 19 pages.

(Continued)

*Primary Examiner* — Marsha D. Banks Harold
*Assistant Examiner* — Natasha W Cosme
(74) *Attorney, Agent, or Firm* — Brake Hughes Bellermann LLP

(57) ABSTRACT

Systems and methods are provided for wireless communication circuitry (202) that includes (1) a first antenna matching circuit (213) configured to tune a first antenna (208) to a first subset of a plurality of frequency bands or a second subset of the frequency bands, and including a first switch (220) with selectable states corresponding to the first and second subsets; (2) a second antenna matching circuit (215) configured to tune a second antenna (210) to a third subset of the frequency bands or a fourth subset of the frequency bands, and including a second switch (222) with selectable states corresponding to the third and fourth subsets; and (3) a third antenna matching circuit (211) configured to tune a third antenna (206) to a fifth subset of the frequency bands. The circuitry is operable with a plurality of service providers associated with the fifth subset and one of the other subsets.

28 Claims, 5 Drawing Sheets

(56) References Cited

U.S. PATENT DOCUMENTS

| | | | | |
|---|---|---|---|---|
| 2011/0299574 A1* | 12/2011 | Rofougaran | ......... | H03D 7/1441 |
| | | | | 375/219 |
| 2012/0188059 A1* | 7/2012 | Ueda | .................... | G06K 7/0008 |
| | | | | 340/10.1 |
| 2014/0015719 A1 | 1/2014 | Ramachandran | | |
| 2014/0038663 A1* | 2/2014 | George | .................. | H04B 1/006 |
| | | | | 455/550.1 |
| 2014/0105079 A1* | 4/2014 | Bengtsson | ............. | H04B 1/005 |
| | | | | 370/297 |

OTHER PUBLICATIONS

Ifixit, "Motorola Moto X Teardown", http://www.ifixit.com/Teardown/Motorola+Moto+X+Teardown/16867, Aug. 23, 2013, 10 pages.

* cited by examiner

SYSTEMS AND METHODS FOR A UNIVERSAL ANTENNA MODULE

FIELD

This application generally relates to wireless communication devices. In particular, the application relates to platforms and techniques for providing a universal antenna module in wireless communications devices.

BACKGROUND

Modern wireless communication devices, including mobile telephones and other portable radio communication devices, offer an expanded set of features that are increasingly dependent on bandwidth and require complex circuitry for performing the multitude of functions that enable those features. One such feature is the flexibility to operate under multiple communications standards and/or across multiple bands of operation to enable interoperability between existing and emerging radio access technologies (RATs) and/or to accommodate international business and recreational travelers. Another feature is the ability to provide high speed, high data rate wireless communications in order to satisfy the growing demand for connectivity in an increasingly mobile world.

To provide at least these features, mobile communications devices now have an increasing number of antennas, covering multiple frequency bands and both cellular RATs and non-cellular RATs. The cellular RATs may include, for example, GSM (Global System for Mobile Communications), EDGE (Enhanced Data Rates for GSM Evolution), UMTS (Universal Mobile Telecommunications System), and LTE (Long Term Evolution). Note that each of these RATs can be considered evolutions of the same platform and are colloquially referred to as 2G, 2.5G, 3G, and 4G technologies, respectively. CDMA (Code Division Multiple Access) is another cellular RAT and can be considered a competing 3G technology that blends into LTE's 4G technology. The non-cellular RATs may include, for example, Bluetooth®, Near Field Communication (NFC), Wireless Local Area Network (WLAN, a.k.a. WiFi), Wireless Metropolitan Area Networks (WMAN, a.k.a. WiMax), Radio Frequency Identification (RFID), Global Positioning System (GPS), etc. The increasing number of antennas has created an increasing number of antenna design challenges related to isolation, efficiency, bandwidth, impedance matching, insertion loss, and other related factors.

Further, because each RAT may support one or more frequency bands, and each frequency band of a given RAT may be assigned to specific regions of the world and/or specific wireless communication carriers, global mobile device manufacturers often create multiple carrier, region, and/or RAT-specific versions or variants of their mobile devices in order to have a presence in various markets around the world. Each of these variants may include antennas and accompanying wireless communication circuitry (e.g., switches, power amplifiers, filters, duplexers, signal paths, transceivers, etc.) that are specifically tuned or optimized for the particular RAT(s) and/or frequency bands supported by the variant, thus increasing costs and manufacturing complexity. For example, some mobile device manufacturers may design a different antenna layout for each wireless communication carrier based on the specific RATs and/or frequency bands associated with the carrier.

Competing with the increasing demands on the radio portion of the mobile device is the constant push to minimize the size, weight, power consumption, and cost of mobile devices. A couple ways to minimize these characteristics include reducing the number of components and/or connections within the device and performing multiple functions using the same components. To that extent, some commercially-available mobile devices include one or more multi-band antennas that are capable of selectively operating in one of a plurality of frequency bands at a time. This arrangement reduces the total required antenna volume when compared against the alternative of a greater quantity of antennas, each having fixed and narrower bandwidth. However, multi-band antennas also add to the design complexity of the radio portion. For example, each multi-band antenna typically requires antenna matching circuitry, or an antenna switch module, as an interface between the antenna and the wireless communication circuitry in order to provide appropriate impedance matching over each frequency of operation. The more frequency bands covered by a mobile device, the more complicated the antenna matching circuitry. Thus, despite efforts to broaden the antenna coverage provided by mobile devices, most commercially-available mobile devices are still incapable of providing complete coverage for all RATs and/or frequency bands without significantly increasing the antenna volume, and complexity, of the device.

In view of the above antenna design challenges, most commercially-available mobile devices include radio portions that can only operate in, and/or are specifically optimized for, certain frequency bands, each of which is allocated to a specific wireless communication carrier. As a result, if users want to switch from one carrier to another, they may also need to switch their mobile devices if their existing devices are incompatible with the frequency bands covered by the new network. Many cost-conscious users may want to switch carriers fairly often in order to take advantage of lower pricing and attractive promotions, such as introductory service rates with terms of expiration. But the prospect of switching mobile devices can be a huge deterrent. For example, switching to a new device involves the cumbersome task of moving photos, contact information, emails, call and text messaging history, applications, and other data stored in the old device to the new device. Users may be reluctant to part from their existing devices for other reasons as well, including familiarity and/or the addition of personalized touches (e.g., customizing the rear housing, adding skins and other embellishments, etc.). Lastly, the cost of switching devices is usually passed on to the consumer in the form of higher service rates. Retaining an already-owned mobile device, while switching carriers can improve service plan options and costs.

In some cases, even if the radio portion of the mobile device is operable in the bands of the new carrier, the user's existing device may be "locked" to the existing carrier. As a result, the mobile device cannot be used with the new carrier's service (except when roaming). Carrier-locks are most common in mobile devices that are heavily subsidized by the carrier and the business model depends on the customer staying with the carrier for a minimum term to recoup the cost of the subsidy. In some cases, the mobile device is locked to a carrier-provided subscriber identity module (SIM) card, such that the device only works with SIM cards from the specific carrier. While a carrier-, or SIM-, locked device can be unlocked by, for example, entering a special code or numeric password, such processes are questionable in some regions (e.g., the United States) and may be too complicated for the average user.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
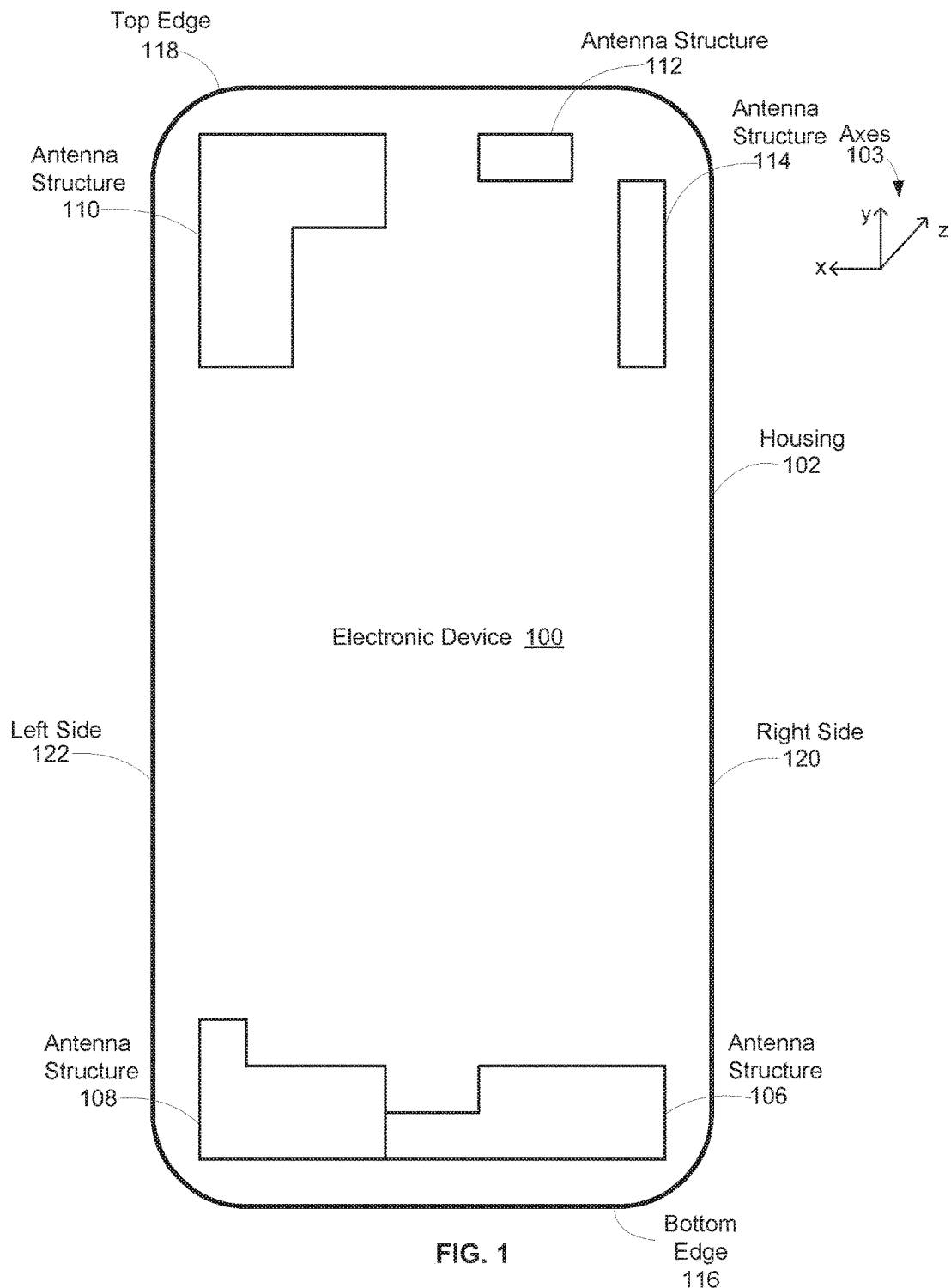
FIG. 1 illustrates an example electronic device including an arrangement of antennas in accordance with some embodiments.

Most commercially-available LTE mobile devices are unable to transmit and/or receive signals in all available LTE low frequency bands, such as the Americas LTE bands 5, 8, 12, 13, 17 and 26 (referred to herein as LTE low bands), in addition to all available LTE high frequency bands, such as the Americas LTE bands 1, 2, 3, 4, 5, 7, 25, and/or 41 (referred to herein as the LTE high bands). This is partly due to the design constraints imposed by tuning antennas to lower frequencies, as low band antennas typically require more antenna volume than high band antennas. As a result, most commercially-available mobile devices have radio portions that are tuned for operation in several high frequency bands but only a select few of the low frequency bands. The lower operating bands are typically selected based on the wireless communication carrier for which the mobile device is being manufactured. For example, there are at least three Americas LTE bands in the 700 MHz range (e.g., bands 12, 13, and 17), and each of these bands is allocated to a different carrier (e.g., U.S. Cellular, Verizon Wireless, and AT&T, respectively). Thus, in order to minimize antenna volume while providing optimal antenna performance within the intended network, most commercially-available mobile devices supporting LTE are tuned for operation in only a single 700 MHz band which is allocated to the intended wireless communication carrier.

Systems and methods disclosed herein provide an electronic device with an antenna module (also referred to herein as a "universal antenna module") that can operate in a predetermined plurality of high frequency bands, as well as a predetermined plurality of low frequency bands. In one aspect, the predetermined plurality of frequency bands (also referred to herein as "operating bands") includes predefined LTE operating bands currently available in the United States (also referred to as "the Americas LTE bands"). The systems and methods disclosed herein overcome the above design constraints by leveraging a realization that certain subsets of the LTE low bands fall within relatively small frequency ranges that have a bandwidth similar to that of a single antenna. According to one aspect, a single switched antenna may be used to selectively cover multiple subsets of the LTE low bands depending on the selected switch state, thereby expanding the low frequency band coverage provided by the electronic device.

For example, according to one aspect, the universal antenna module includes an arrangement of antenna structures, including at least two "switched antennas" and at least one "non-switched antenna." Each of the switched antennas is coupled to an antenna matching network that is configured to select one of two operating states for the antenna. In one aspect, each operating state corresponds to optimal configurations for a specific subset of the LTE low bands. As a result, the switched antennas are able to optimally cover multiple LTE low bands by switching between different operating states, as needed. Furthermore, the "non-switched antenna" primarily covers the LTE high bands and is coupled to an antenna matching network that does not have selectable operating states. According to one aspect, each of the switched antennas is also configured to operate in certain LTE high bands, regardless of the selected operating state.

Accordingly, the systems and methods disclosed herein can provide full coverage for all of the Americas LTE bands using a single, universal antenna arrangement. In some aspects, the universal antenna arrangement is included in a mobile device that is "unlocked," so that the device can be used with any wireless communication carrier. As a result, the user is no longer required to switch his mobile device each time he changes from one wireless communication carrier to another. Instead, upon signing up with a new carrier, the user can simply insert the new carrier's SIM card into the same device (assuming that the mobile device is unlocked).

While the portions of this description references the Americas LTE bands, the techniques disclosed herein can be applied to other frequency bands, whether supported by LTE or other wireless communication standards. As used herein, the term "wireless communication standards" includes any type of radio access technology (RAT), including wireless wide area networks (e.g., GSM, EDGE, CDMA, WCDMA (Wideband Code Division Multiple Access), TD-SCDMA (Time Division Synchronous CDMA), HSPA (High Speed Packet Access), UMTS, LTE, GPS, WiMAX, etc.), wireless local area networks (e.g., WiFi, etc.), and wireless personal area networks (e.g., Bluetooth, NFC, RFID, ZigBee, UWB (Ultra Wide Band), etc.). The range of frequencies covered by each RAT system varies widely, can be specific to a country or region, and in some cases, overlaps across systems. For example, WiFi and Bluetooth both operate in the ISM (industrial, scientific, and medical) radio band that appears at or around 2400 MHz (more specifically, at 2450 MHz), and GPS operates at or around the 1575 MHz band.

The GSM digital system currently operates in several frequency bands between 850 megahertz (MHz) and 1900 MHz. More specifically, the GSM system uses a frequency band around 850 MHz that is known as GSM850 or GSM800 and can include, e.g., 824-849 MHz on the uplink (UL) and 869-894 on the downlink (DL). The GSM system also uses a frequency band around 900 MHz that is known as GSM900 and can include, e.g., 890-915 MHz UL and 935-960 MHz DL. Additionally, the GSM system uses a frequency band around 1800 MHz that is known as GSM1800 and can include, e.g., 1710-1785 MHz UL and 1805-1880 MHz DL. Further, the GSM system uses a frequency band around 1900 MHz that is known as GSM1900 and can include, e.g., 1850-1910 MHz UL and 1930-1990 MHz DL. GSM900 and GSM1800 are used in most parts of the world, including Europe, Middle East, Africa, Australia, Oceania, and most of Asia. GSM 850 and GSM 1900 are used in Canada and the United States. Different countries within South and Central America use different combinations of the GSM bands. The GSM system includes other, less commonly used frequency bands that are not listed herein for the sake of brevity. EDGE adds a packet-data infrastructure to GSM and is fully backwards-compatible with the older GSM network. Thus, EDGE can operate within the existing GSM frequency bands.

UMTS utilizes the same core network as GSM but employs WCDMA technology. In general, the UMTS system operates in several frequency bands between 700 MHz and 2100 MHz. The specific frequency bands allocated to UMTS are divided into numbered operating bands, which are assigned to specific regions of the world. Four of these operating bands, commonly known as WCDMA850 (Band 5), WCDMA900 (Band 8), DCS1800 (Band 3), and WCDMA1900 (Band 2), at least generally overlap with the GSM850, GSM900, GSM1800, and GSM1900 frequency bands, respectively. Operating band 4, commonly known as WCDMA1700 or AWS (Advanced Wireless Services), includes frequencies around 1700 MHz on the uplink (UL) (e.g., 1710-1755 MHz UL) and 2100 MHz on the downlink (DL) (e.g., 2110-2155 MHz). Operating band 1, commonly known as WCDMA2100, includes frequencies around 2100 MHz (e.g., 1920-1980 MHz UL and 2110-2170 MHz DL). Operating band 7, commonly known as IMT-E, includes frequencies around 2600 MHz (e.g., 2500-2570 MHz UL and 2620-2690 MHz DL). Operating bands 12, 13, and 17, commonly known as SMH, include frequencies around 700 MHz (e.g., 698-716 MHz UL and 728-746 MHz DL, 777-787 MHz UL and 746-756 MHz DL, and 788-798 MHz UL and 758-768 MHz DL, respectively). Operating band 11 includes frequencies around 1500 MHz (e.g., 1428-1448 MHz UL and 1476-1496 MHz DL). Operating bands 19 and 20 include frequencies around 800 MHz (e.g., 832-842 MHz UL and 877-887 MHz DL, and 832-862 MHz UL and 791-821 MHz DL, respectively). UMTS covers additional operating bands that are not listed here for the sake of brevity.

The CDMA system currently operates in several frequency bands between 850 MHz and 2100 MHz. More specifically, the frequency bands covered by CDMA in different regions of the world include: bands BC0 and BC10, both of which cover frequencies at or around 850 MHz; band BC1, which covers frequencies at or around 1900 MHz band; and BC15, which covers frequencies at or around 1700 MHz UL and 2100 MHz DL. Further, the CDMA system currently provides coverage throughout North America and in Brazil, China, India, and South Korea, as well as other regions of the world.

LTE is designed to coexist with the UMTS and GSM systems and therefore, supports both future and legacy (existing) frequency bands, including the operating bands listed above for the GSM and UMTS systems. Accordingly, the LTE system currently operates in frequencies between 700 MHz and 2600 MHz, depending on the specific region of the world. Specifically, the frequency bands covered by LTE include: 700 MHz or Bands 12, 13, or 17, used in the United States and Canada; 800 MHz or Band 20, used in Europe; 850 MHz or Band 5, used in the Americas, parts of Asia, and Australia; 900 MHz or Band 8, used in parts of South America and Asia and in South Africa; AWS or Band 4, used in the United States, Canada, and Chile; 1800 MHz or Band 3, used in Europe, Asia, and Oceania; 1900 MHz or Band 2, used in North America and parts of South America; 2100 MHz or Band 1, used in Brazil, Europe, Asia, Africa, and Oceania; 2500 MHz or Band 41, used in South America; and 2600 MHz or Bands 7 or 38, used (or projected for use) in North America and parts of South America, Asia, and Europe.

Table 1 lists more detail about the Americas LTE bands that are currently available in the United States and/or other parts of North America, Central America, South America, or the Caribbean. Specifically, for each predefined LTE band, Table 1 lists the general frequency band value and the specific frequency ranges for the uplink and downlink channels, where applicable. For the operating bands available in the United States, Table 1 also lists each U.S. carrier that has been allocated the band.

TABLE 1

| LTE Band | Frequency Band (MHZ) | Uplink Channel/Transmit Range (MHz) | Downlink Channel/Receive Range (MHz) | Wireless Communication Carrier |
| --- | --- | --- | --- | --- |
| 1 | 2100 | 1920-1980 | 2110-2170 | (international roaming) |
| 2 | 1900 | 1850-1910 | 1930-1990 | AT&T |
| 3 | 1800 | 1710-1785 | 1805-1880 | (international roaming) |
| 4 | 1700 | 1710-1755 | 2110-2155 | AT&T, T-Mobile, Verizon Wireless |
| 5 | 850 | 824-849 | 869-894 | U.S. Cellular, Verizon Wireless, AT&T, Sprint |
| 7 | 2600 | 2500-2570 | 2620-2690 | (international roaming) |
| 8 | 900 | 880-915 | 925-960 | (international roaming) |
| 12 | 700 | 699-716 | 729-746 | U.S. Cellular |
| 13 | 700 | 777-787 | 746-756 | Verizon Wireless |
| 17 | 700 | 704-716 | 734-746 | AT&T |
| 25 | 1900 | 1850-1915 | 1930-1995 | Sprint |
| 26 | 800 | 814-849 | 859-894 | Sprint |
| 41 | 2500 | 2496-2690 | | Sprint |

Certain analysis leveraged by the techniques disclosed herein will now be discussed. As can be seen from the frequency ranges listed in Table 1, the different 700 MHz frequency bands allocated to different carriers are very close together in spectral terms. For example, the Americas LTE band 12 uplink channel, 699 MHz-716 MHz, completely overlaps, or includes, the Americas LTE band 17 uplink channel, 704 MHz-716 MHz. Likewise, the Americas LTE band 12 downlink channel, 729 MHz-746 MHz, completely overlaps, or includes, the Americas LTE band 17 downlink channel, 734 MHz-746 MHz. As a result, a single transmit and/or receive (Tx/Rx) antenna with a 47 MHz bandwidth can cover both of the LTE bands 12 and 17 (because the broader of the two bands, the LTE band 12, spans a 47 MHz range). Incidentally, the Americas LTE band 13 has a very similar range of 41 MHz. Accordingly, in some embodiments, a single switched antenna having a 47 MHz bandwidth is able to cover transmit and/or receive operations in any of the LTE bands 12, 13, and/or 17, depending on the switch position.

As also shown in Table 1, the Americas LTE band 13 is spectrally adjacent to the LTE bands 12 and 17, as the LTE band 13 downlink channel begins where the downlink channels of the LTE bands 12 and 17 end, namely at a frequency of 746 MHz. Further, the LTE band 13 downlink channel ends at 756 MHz. Thus, the downlink channels of the LTE bands 12, 13, and 17 are within a 27 MHz bandwidth (e.g., from 729 MHz to 756 MHz). As a result, a single receive or diversity (DRx) antenna with a 27 MHz bandwidth can cover the receive frequencies of any of the LTE bands 12, 13, and/or 17. Incidentally, the downlink channel of the Americas LTE band 5, 869 MHz to 894 MHz) covers a very similar range of 25 MHz. Accordingly, in some embodiments, a single switched antenna having a 27 MHz bandwidth is able to cover receive operations in any of the LTE bands 5, 12, 13, and/or 17, depending on the switch position.

In one embodiment, the combination of a single switched antenna capable of covering the receive frequencies of LTE bands 5, 12, 13, and/or 17 and a single switched antenna capable of covering the transmit and/or receive frequencies of LTE bands 12, 13, and/or 17 creates an antenna arrangement that can be operated in any of the Americas LTE bands without the need for additional antenna volume and/or bandwidth, as described in more detail below.

FIG. 1 depicts an example electronic device 100 consistent with some embodiments. It should be appreciated that the electronic device 100, as depicted, is merely an example and can include various combinations of hardware and/or software components. According to some embodiments, the electronic device 100 may be a mobile computing device, such as, for example, a smartphone or any other type of mobile communications device, a tablet, an e-reader, a portable gaming device, a portable media player, a personal digital assistant, a laptop computer, a desktop computer, or any other mobile or electronic device that includes one or more wireless communications devices. In FIG. 1, the electronic device 100 is depicted as a mobile device.

As shown in FIG. 1, the electronic device 100 may include a main body or housing 102 that houses a majority of the electronic components included in the mobile device. The housing 102 may be composed of plastic, metal, or any other suitable material. FIG. 1 illustrates a back face of the electronic device 100, as indicated by the negative orientation of the z-axis in axes 103. The electronic device 100 can include an antenna arrangement that is positioned within the housing 102 and includes independent, discontinuous antenna structures 106, 108, 110, 112, and 114. The antenna structures 106, 108, 110, 112, and 114 may be any suitable type of antenna, such as, e.g., an inverted L-antenna, dual inverted L-antenna, inverted-F antenna, or hybrids of these antenna structures.

FIG. 1 further illustrates that the housing 102 may include a bottom edge 116, a top edge 118, a right side 120 and a left side 122. It should be noted that the terms "left," "right," "top," and "bottom" are used only for the purposes of providing reference to the relative positions of these edges/sides. According to one aspect, the antenna structures 106 and 108 may be positioned adjacent to an edge of the housing 102, such as the bottom edge 116. And the antenna structures 110, 112, and 114 may be positioned adjacent to, or towards, an opposing edge of the housing 102, such as the top edge 118. In addition, the antenna structures 108 and 110 may be positioned towards one side of the housing 102, such as the left side 122. And the antenna structures 106, 112, and 114 may be positioned adjacent to, or towards, an opposing side of the housing 102, such as the right side 120. More specifically, according to the illustrated embodiment, the antenna structure 112 may be adjacent to the top edge 118 and positioned towards the right side 120 of the housing 102. The antenna structure 114 may be adjacent to the right side 120 and positioned towards the top edge 118 of the housing 102, and the antenna structure 110 may be adjacent to both the left side 122 and the top edge 118 of the housing 112, as shown in FIG. 1. Further, the antenna structure 108 may be adjacent to both the left side 122 and the bottom edge 116, and the antenna structure 106 may be adjacent to both the right side 120 and the bottom edge 116, as also shown in FIG. 1.

It should be noted that FIG. 1 is only an exemplary representation of the antenna arrangement of the electronic device 100 and is provided to show the general locations and relative sizes of the antenna structures included therein. The exact geometries of the antenna structures 106, 108, 110, 112, and 114 may differ from those of the illustrated embodiment. For example, according to some embodiments, a shape and/or curvature of a rear housing portion of the housing 102 can determine or impact aspects of the antenna arrangement, because the antenna structures 106, 108, 110, 112, and 114 are placed towards the edges of the electronic device 100, and the edges of an antenna typically correspond to the points of the antenna where electric current and radiation are the strongest. Further, the exact geometries of the antennas 106, 108, 110, 112, and 114 may be impacted by the placement and/or proximity of electronic components and other conductive components of the electronic device 100.

The antenna structures 106, 108, 110, 112, and 114 may be configured to support various types of wireless communications (or RATs), including non-cellular network communications (e.g., GPS, NFC, Bluetooth, WiFi, etc.) and voice and data cellular telephone communications (e.g., GSM, CDMA, UMTS, LTE, etc.). To this end, each of the antenna structures 106, 108, 110, 112, and 114 may be tuned to one or more of the frequency bands that are associated with the RATs supported by the electronic device 100. In one embodiment, the antenna structures 106, 108, 110, 112, and 114, as a whole, are tuned to cover a RAT's entire banding, such as, e.g., all of the Americas LTE bands (as shown previously in Table 1). For example, the plurality of frequency bands supported by the antennas 106, 108, 110, 112, and 114 may include LTE high bands B1 (e.g., 2100 MHz), B2 and B25 (e.g., 1900 MHz), B3 (e.g., 1800 MHz), B4 (e.g., 1700 MHz), B7 (e.g., 2600 MHz), and/or B41 (e.g., 2500 MHz), in addition to carrier-specific LTE low bands B5 (e.g., 850 MHz, for U.S. Cellular networks), B12 (e.g., 700 MHz, for US Cellular networks), B13 (e.g., 700 MHz, for Verizon networks), and/or B17 (e.g., 700 MHz, for AT&T networks).

Further, each of the antenna structures 106, 108, 110, 112, and 114 may serve different functions related to sending and receiving data. For example, the antennas may be transmit (Tx) antennas that only send voice and/or data communications, receive (Rx) antennas that only receive voice and/or data communications, or transmit/receive (Tx/Rx) antennas that both send and receive voice and/or data communications. According to some aspects, the antenna arrangement may include two Rx antennas: a primary Rx antenna and a secondary or diversity Rx (DRx) antenna. The primary Rx antenna may be part of a main antenna (e.g., Tx/Rx antenna), and the DRx antenna may be configured to provide support to, or otherwise work in conjunction with, the primary Rx antenna to enhance the receive performance of the antenna arrangement. According to one aspect, the DRx antenna may be a separate antenna structure from the primary Rx antenna. According to one embodiment, the antenna arrangement may include two Tx/Rx antennas (one primary and one secondary) and one DRx antenna that supports both Tx/Rx antennas.

The specific function of an antenna included in the antenna arrangement of the electronic device 100 may depend at least partially on the particular communication needs of the electronic device 100, such as, for example, the different RATs, frequency bands, regions, and/or wireless carriers supported by the device 100. The function of the antenna may further depend on the placement of the antenna structure within the electronic device 100 and the size, geometry, and/or layout of the available antenna volume. For example, Tx/Rx antennas generally require more antenna volume than, for example, Tx antennas or Rx antennas at least because Tx/Rx antennas need more bandwidth in order to cover both transmit and receive functions. As another example, Tx antennas generally require more antenna volume than, for example, Rx antennas at least because Tx antennas need higher antenna efficiency in order to satisfy performance requirements. Further, larger antenna volumes can allow for more flexibility in antenna banding (e.g., able to be tuned to more frequencies). Accordingly, in some embodiments, the main Tx/Rx antenna(s) of an electronic device may be placed within the largest, discrete antenna volume of the antenna arrangement.

For example, in the illustrated embodiment, the antenna structures 106 and 108 may be Tx/Rx antennas. In order to provide optimal antenna performance, the antenna structures 106 and 108 have been placed adjacent to the bottom edge 116 of the electronic device 100, as the bottom portion of the electronic device 100 has a larger antenna volume. In some embodiments, the antenna structure 106 may be tuned to mostly high frequency bands, while the antenna structure 108 may be tuned to mostly lower frequency bands. This separation of low and high frequency bands allows for more efficient use of the antenna volume at the bottom of the electronic device 100, especially because antennas tuned to lower frequency bands may require more antenna volume, and antennas covering similar frequency bands may be placed into one antenna volume. For example, the antenna structure 108 may be utilized for coverage of a few low frequency bands, such as the Americas LTE bands 12, 13, and/or 17, which are all closely together in the 700 MHz range, as well as one or more high frequency bands, such as the Americas LTE bands 7 and/or 41, which span across the 2500-2600 MHz range. And the antenna structure 106 may be utilized for coverage of several high frequency bands, such as the Americas LTE bands 1, 2, 3, 4, and/or 25, which span across the broad 1700-2100 MHz range, as well as one or more low frequency bands, such as the Americas LTE bands 5, 8, and/or 26, which span across the 800-900 MHz range.

According to some aspects, the antenna structure 110 may be a DRx antenna that supports the entire Tx/Rx banding of the antennas 106 and 108, because diversity receive antennas typically require less antenna volume than transmit antennas. For example, the antenna structure 110 may be configured to cover reception for one or more of the Americas LTE bands 1, 2, 3, 4, 5, 7, 8, 12, 13, 17, 25, 26, and/or 41. Further, the antenna structures 112 and 114 may include one or more Tx, Rx, DRx, and/or Tx/Rx antennas, depending on the remaining frequency banding required to support operation of the electronic device 100. For example, in one embodiment, the antenna structures 112 and/or 114 may be tuned for any combination of the frequency bands required to support GPS, WiFi, NFC, and/or Bluetooth technologies.

Figure 2:
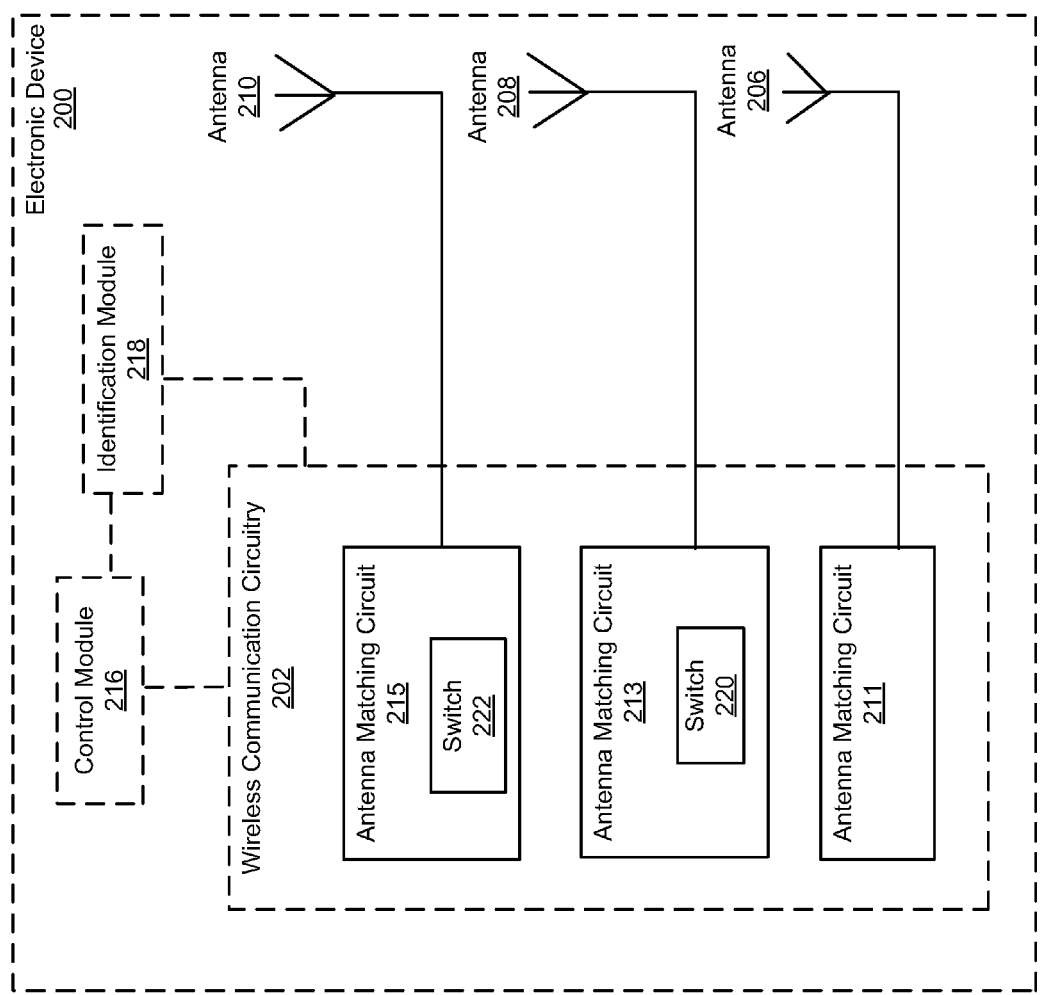
FIG. 2 is a block diagram of an example electronic device including a plurality of antennas coupled to wireless communication circuitry in accordance with some embodiments.

According to some aspects, the electronic device 100 may include wireless communication circuitry (not shown), similar to wireless communication circuitry 202 in FIG. 2. The wireless communication circuitry may be configured to operate in the plurality of frequency bands covered by the electronic device 100 and pass signals to, and/or receive signals from, the antenna structures 106, 108, 110, 112, and/or 114. Further, the wireless communication circuitry may include a plurality of antenna matching circuits configured to tune at least the antennas 106, 108, and 110 to one or more of the frequency bands covered by the electronic device 100.

In some embodiments, one or more of the antenna matching circuits may include a switch for selectively changing the operating band of the antenna coupled thereto. The switch may have two operating states corresponding to different frequency bands, and the antenna may be tuned to operate within the frequencies associated with the selected state, as explained in more detail below with respect to FIGS. 2-4. For example, each of the antennas 110 and 108 may be coupled to an antenna matching circuit that includes a switch for changing the operating band of the antenna. According to one aspect, the antenna 110 may be configured to receive signals in either the Americas LTE band 5 or the Americas LTE bands 12, 13, and/or 17, depending on the selected switch state. And the antenna 108 may be configured to transmit and/or receive signals in either the Americas LTE band 13 or the Americas LTE bands 12 and/or 17, depending on the selected switch state. According to one aspect, the antenna 106 may not be coupled to a switch for changing the operating state of the antenna and may be configured to transmit and/or receive signals in one or more of the Americas LTE bands 1, 2, 4, 5, and/or 25. According to another aspect, one or more of the antennas 106, 108, and 110 may be additionally configured to transmit and/or receive signals in one or more of the Americas LTE bands 3, 7, 8, 26, or 41.

FIG. 2 illustrates an example electronic device 200 including a plurality of antennas and wireless communication circuitry 202 consistent with some embodiments. The wireless communication circuitry 202 may include, for example, a plurality of amplifiers, power inverters, filters, switches, matching networks (e.g., including one or more resisters, inductors, and/or capacitors), and other components typically found in the radio frequency (RF) front-end architecture of a mobile communications device. It should be appreciated that the electronic device 200 and the wireless communication circuitry, as depicted, are merely an example and can include various combinations of hardware and/or software components. According to some embodiments, the electronic device 200 may be a mobile computing device, such as, for example, a smartphone or any other type of mobile communications device, a tablet, an e-reader, a portable gaming device, a portable media player, a personal digital assistant, a laptop computer, a desktop computer, or any other mobile or electronic device that includes one or more wireless communication components. In FIG. 2, the electronic device 200 is depicted as a mobile device.

According to some aspects, the plurality of antennas includes at least antennas 206, 208, and 210, similar to the antennas 106, 108, and 110, respectively, and may include additional antennas (not shown), similar to the antennas 112 and 114. The plurality of antennas may include any suitable type of antenna structure, such as, e.g., an inverted L-antenna, dual inverted L-antenna, inverted-F antenna, or hybrids of these antenna structures. Each of the plurality of antennas may be coupled to a respective one of a plurality of antenna matching circuits included in the wireless communication circuitry 202. For example, in the illustrated embodiment, the antenna 206 is coupled to antenna matching circuit 211, the antenna 208 is coupled to antenna matching circuit 213, and the antenna 210 is coupled to antenna matching circuit 215.

Each of the antenna matching circuits 211, 213, and 215 may be configured to tune the antenna coupled thereto for optimal operation in one or more specified frequency bands. For example, the plurality of antennas may be configured to support various types of wireless communications (or RATs), including non-cellular network communications (e.g., GPS, NFC, Bluetooth, WiFi, etc.) and voice and data cellular telephone communications (e.g., GSM, CDMA, UMTS, LTE, etc.). To this end, the antenna matching circuits 211, 213, and 215 may tune the antennas 206, 208, and 210, respectively, to one or more of the frequency bands that are associated with the RATs supported by the electronic device 200, as discussed in more detail below. During operation of the electronic device 200, the exact frequency band covered by each of the antennas 206, 208, and/or 210 at a given time may vary depending on a variety of factors, including, for example, the spectrum availability in the region in which the user is currently located, and/or the signal strength in each of the operating bands.

The electronic device 200 may further include a control module 216 configured to send a control signal to the wireless communication circuitry 202 to control at least the operating band of the antenna matching circuits 213 and 215. In some embodiments, the control module 216 may be further configured to generate and/or transmit one or more control signals to the wireless communication circuitry 202 for controlling other operations of the wireless communications circuitry 202. In one embodiment, the control signal sent by the control module 216 includes an instruction to at least one of the antenna matching circuits 213 and/or 215 to operate in a specific frequency band. In some embodiments, the wireless communication circuitry 202, the control module 216, and/or a processor (not shown) of the electronic device 200 may determine which frequency band of operation to use for transmitting and/or receiving signals based on, for example, information received by the antennas 206, 208, and/or 210 from one or more wireless communication system(s) (e.g., base station and/or access point infrastructure) regarding spectral availability, region-specific information, signal strength, etc. In one embodiment, the wireless communication circuitry 202 may make this determination and provide the frequency information to the control module 216, and the control module 216 may formulate the control signal based thereon.

The control module 216 may be any type of integrated circuit capable of generating and/or providing one or more control signal(s) to the wireless communication circuitry 202. According to some embodiments, the control module 216 may include, or be included within, a processer (such as, e.g., a digital signal processor, a microcontroller, a microprocessor, etc.), a modem, a modulator, a demodulator, and/or a power management unit. The one or more control signal(s) provided by the control module 216 to the antenna matching circuits 213 and 215 may be a control logic signal (e.g., "0", "1", low, high, etc.), an MIPI (Mobile Industry Processor Interface) control signal (e.g., including a clock signal and a data signal), or any other type of control signal.

According to some embodiments, the electronic device 200 further includes an identification module 218. The identification module 218 may include a subscriber-identification-module (SIM) card that is provided by the wireless communication carrier with which the user of the electronic device 200 has service. The SIM card stores carrier-identification information (or carrier information), which may be read by the identification module 218 when the user inserts the SIM card into an appropriate slot or other port (e.g., the identification module port 546 on FIG. 5) of the electronic device 200. The carrier information identifies the user's wireless communication carrier, the region and/or network in which the electronic device 500 will be operating, and/or the operating bands allocated to the carrier.

In some embodiments, the identification module 218 may be configured to provide the carrier information to the control module 216. The control module 216 may analyze the carrier information, determine or identify the frequency bands associated with the identified carrier, and generate one or more control signals for tuning one or more of the antennas 206, 208, or 210 to one or more of the identified frequency bands. The control module 216 may then send the generated control signals to the wireless communication circuitry 202. In other embodiments, the identification module 218 may be configured to provide the carrier information directly to the wireless communication circuitry 202, and the wireless communication circuitry 202 may apply the received information to tune one or more of the antennas 206, 208, or 210 according to the frequency bands associated with the present carrier.

In some embodiments, the electronic device 200 may be a dual-SIM mobile device that accepts two SIM cards and thereby, enables a user to quickly switch between service providers while using the same device. In such embodiments, the identification module 218 may include two SIM cards and each of the SIM cards may be associated with a different RAT, geographical region, cost structure to the user based on data/voice usage or time-of-usage, and/or wireless carrier. The control module 216 and/or the processor may decide which of the two SIM cards to use or activate depending on, for example, the region or wireless network in which the device 200 is currently located, current roaming status, spectral availability, data or voice activation, signal strength, etc. Based on spectral information associated with the selected SIM card, the control module 216 may then generate and send a control signal to the antenna matching circuit 213 and/or 215 to enable operation in the frequency bands applicable to the active SIM card.

According to some embodiments, the antenna matching circuits 211, 213, and/or 215 may be pre-configured by the manufacturer for optimal performance in certain operating bands, such as the 800 MHz, 850 MHz, 900 MHz, 1800 MHz, 1900 MHz, 2100 MHz, 2500 MHz, and/or 2600 MHz frequency bands (e.g., one or more of the Americas LTE bands 1, 2, 3, 4, 5, 7, 8, 25, 26, or 41). For example, the antenna matching circuit 211 may be specifically configured to tune the antenna 206 to transmit and/or receive signals in one or more of the Americas LTE bands 1, 2, 3, 4, 5, 8, 25, or 26. The antenna matching circuit 213 may be specifically configured to tune the antenna 208 to transmit and/or receive signals in one or more of the Americas LTE bands 7 or 41. And the antenna matching circuit 215 may be specifically configured to tune the antenna 210 to receive signals in one or more of the Americas LTE bands 1, 2, 3, 4, 5, 7, 8, 25, 26, or 41.

According to some embodiments, the antenna matching circuits 213 and 215 may be further configured to selectively tune the antennas 208 and 210, respectively, to additional operating bands, such as the carrier-specific 700 MHz frequency bands and/or at least one portion of the 850 MHz band, depending on the service provider currently linked to the electronic device 200. In order to accomplish selective tuning of the antennas 208 and 210, the antenna matching circuits 213 and 215 can include one or more switches, each switch including at least two selectable stages. For example, in FIG. 2, the antenna matching circuit 213 includes a switch 220, and the antenna matching circuit 215 includes a switch 222. The switches 220 and 222 are configured to tune the antennas 208 and 210, respectively, to different frequency band(s) based on the selected switch state (or switch position). The switches 220 and 222 may include any type of switch technology that can be used in a mobile communication device, including for example, field-effect transistor (FET) switches, such as Gallium Arsenide (GaAs) and CMOS; mechanical switches, such as subminiature relays and micro-electro-mechanical systems (MEMS); and PIN diodes. In one embodiment, the switches 220 and 222 include PIN diode switches (such as, e.g., series PIN diode switch 306 in FIG. 3 or shunt PIN diode switch 406 in FIG. 4). According to one aspect, a PIN diode switch may have a series resistance that is substantially equivalent to that of the antenna, thereby enabling optimal antenna performance. In another embodiment, the switches 220 and 222 include MEMs switches with multiple stages.

The systems and methods disclosed herein enable a single antenna to selectively operate in multiple frequency bands depending on a current switch position and thereby, provide an antenna that can be broad in function, but relatively small in size. For example, as shown in Table 2, a first antenna, such as the antenna 208, may be tuned to the Americas LTE band 13 by selecting an "ON" state for a first switch, such as the switch 220. And the first antenna may be tuned to at least one of the Americas LTE bands 12 or 17 by selecting the "OFF" state for the first switch. Accordingly, at a given time, the antenna 208 is tuned to either LTE band 13 or LTE bands 12 and/or 17. Likewise, a second antenna, such as the antenna 210, may be tuned to the Americas LTE band 5 by selecting an "ON" state for a second switch. And the second antenna may be tuned to at least one of the Americas LTE bands 12, 13, or 17 by selecting an "OFF" state for the second switch. Accordingly, at a given time, the antenna 210 is tuned to either LTE band 5 or LTE bands 12, 13, and/or 17. As mentioned above, the antenna 210 may be a diversity antenna and therefore, the antenna 210 may be tuned to cover an appropriate spectral portion of the selected operating band (e.g., a downlink portion).

TABLE 2

|  | Antenna 1 | | Antenna 2 | |
| --- | --- | --- | --- | --- |
| Switch 1 | ON | OFF | — | — |
| Switch 2 | — | — | ON | OFF |
| LTE Band(s) | 13 | 12 and/or 17 | 5 | 12 and/or 17 and 13 |

An exemplary operation of the electronic device will now be described. Upon the identification module 218 identifying the present service provider of the electronic device 200 as, for example, Verizon Wireless, the control module 216 and/or the identification module 218 may determine, based on Table 1, that the antennas 208 and 210 should to be tuned to LTE band 13. To implement this, the control module 216 may generate control signals for each of the switches 220 and 222 based on Table 2. For example, one control signal may instruct the antenna matching circuit 213 to turn the switch 220 "ON," so that the antenna 208 is tuned to transmit and/or receive signals in the LTE band 13. And another control signal may instruct the antenna matching circuit 215 to turn the switch 222 "OFF," so that the antenna 210 is tuned to receive signals in the LTE band 13. In the above manner, the electronic device 200 may be configured for full transmit and receive operation in the LTE band 13.

According to another example, upon identifying the present service provider of the electronic device 200 as Sprint, the control module 216 may instruct the antenna matching circuit 215 to turn the switch 222 ON, in order to tune the antenna 210 to the receive portion of the LTE band 5. As shown in Table 2, the switch state of switch 220 does not impact the LTE band 5 operation. Instead, the transmit and/or receive operation for the LTE band 5 is provided by the antenna 206, without any need for switching. That is, antenna 206 may be pre-configured for Tx/Rx operation in the LTE band 5. Other possible operational states of the electronic device 200 will be understood based on Tables 1 and 2.

Figure 3:
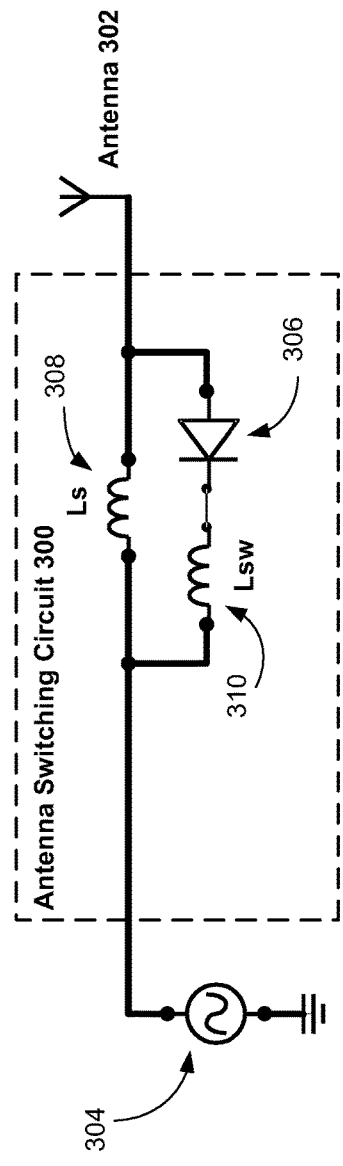
FIG. 3 illustrates an example antenna matching circuit coupled between an antenna and a signal feed within an electronic device in accordance with some embodiments.

FIG. 3 depicts an example antenna switching circuit 300 for implementing the switched antenna techniques disclosed herein. As illustrated, the antenna switching circuit 300 is coupled between an antenna 302 and a signal source 304. The antenna 302 may be any suitable type of antenna, such as, e.g., an inverted L-antenna, dual inverted-L antenna, inverted-F antenna, or hybrids of these antenna structures. According to some aspects, the antenna switching circuit 300 may be included in an antenna matching network (not shown) of a mobile communication device (such as, e.g., the electronic device 200). For example, the antenna switching circuit 300 may be included in any one of the switches 220 and 222 in FIG. 2, and the antenna 302 may be any one of the antennas 208 and 210. The signal source 304 may be a transmitter, a receiver, or a transceiver (such as, e.g., cellular transceiver 536 in FIG. 5). Other electronic components (not shown) may be coupled between the antenna 302, the antenna switching circuit 300, and/or the signal source 304 including, for example, RLC circuitry, RF front end architecture, impedance matching network circuitry, etc.

As shown in the exemplary embodiment of FIG. 3, the antenna switching circuit 300 includes a series PIN diode or a PIN diode switch 306 connected in series with the antenna 302. According to some aspects, the antenna switching circuit 300 is configured such that when the PIN diode switch 306 is turned off (e.g., in the "OFF" state or position), the antenna 302 is tuned to its lowest operational frequency. And when the PIN diode switch 306 is turned on (e.g., in the "ON" state or position), the antenna 302 is tuned to a higher operational frequency.

To accomplish a dual-stage frequency response, the antenna switching circuit 300 further includes inductors 308 and 310. The inductors 308 and 310 may have inductance values Ls and Lsw, respectively, which are specifically selected to tune the antenna 302 to higher or lower frequencies depending on the operational state of the PIN diode switch 306. For example, according to some aspects, because the inductors 308 and 310 are connected in parallel to each other and the inductor 310 is connected in series to the PIN diode switch 306, when antenna signals are able to flow through both inductors 308 and 310 (e.g., when the PIN diode is on or forward-biased), the total inductance value of the circuit 300 may be reduced to $1/(1/Ls+1/Lsw)$. This lower inductance value causes the antenna 302 to be tuned higher. And when antenna signals can only flow through the inductor 308 (e.g., when the PIN diode is off or reverse biased), the total inductance value of the circuit 300 is Ls, which causes the antenna 302 to be tuned lower.

According to one aspect, the inductors 308 and 310 (e.g., the inductance values Ls and Lsw) may be configured to match the low frequency response of the antenna 302, such as, e.g., the LTE low bands. For example, in one embodiment, the higher operational frequencies include the LTE band 5, and the lower operational frequencies include the LTE bands 12, 13, and/or 17. Thus, when the PIN diode switch 306 is on, the antenna 302 is tuned to LTE band 5, and when the PIN diode switch 306 is off, the antenna 302 is tuned to the lower LTE bands 12, 13, and/or 17. In another embodiment, the higher operational frequencies include the LTE band 13, and the lower operational frequencies include the LTE bands 12 and 17. Thus, when the PIN diode switch 306 is off, the antenna 302 is tuned to LTE band 13, and when the PIN diode switch 306 is on, the antenna 302 is tuned to the lower LTE bands 12 and 17. According to some aspects, the antenna 302 may also be tuned to higher frequency bands (such as, e.g., the LTE high bands) by adding, for example, capacitors (not shown) to the circuit 300.

Figure 4:
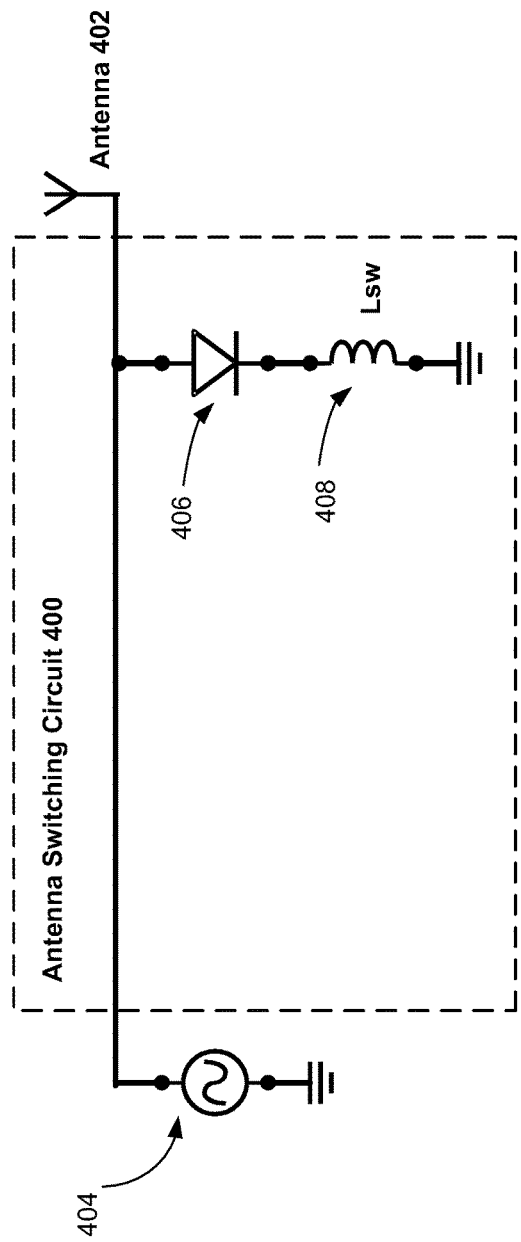
FIG. 4 illustrates a second example antenna matching circuit coupled between an antenna and a signal feed within an electronic device in accordance with some embodiments.

FIG. 4 depicts another example antenna switching circuit 400 for implementing the switched antenna techniques disclosed herein. As illustrated, the antenna switching circuit 400 is coupled between an antenna 402 and a signal source 404. The antenna 402 may be any suitable type of antenna, such as, e.g., an inverted L-antenna, dual inverted-L antenna, inverted-F antenna, or hybrids of these antenna structures. According to some aspects, the antenna switching circuit 400 may be included in an antenna matching network (not shown) of a mobile communication device (such as, e.g., the electronic device 200). For example, the antenna switching circuit 400 may be included in any one of the switches 220 and 222 in FIG. 2, and the antenna 402 may be any one of the antennas 208 and 210. The signal source 404 may be a transmitter, a receiver, or a transceiver (such as, e.g., cellular transceiver 536 in FIG. 5). Other electronic components (not shown) may be coupled between the antenna 402, the antenna switching circuit 400, and/or the signal source 404 including, for example, RLC circuitry, RF front end architecture, impedance matching network circuitry, etc.

As shown in the exemplary embodiment of FIG. 4, the antenna switching circuit 400 includes a shunt PIN diode or a PIN diode switch 406 connected in parallel with the antenna 402. According to some aspects, the antenna switching circuit 400 is configured such that when the PIN diode switch 406 is turned off (e.g., in the "OFF" state or position), the antenna 402 is tuned to its lowest operational frequency. And when the PIN diode switch 406 is turned on (e.g., in the "ON" state or position), the antenna 402 is tuned to a higher operational frequency.

To accomplish a dual-stage frequency response, the antenna switching circuit 400 further includes an inductor 408 coupled in series with the PIN diode switch 406. According to one aspect, when the PIN diode 406 is off, or reversed biased, antenna signals are prevented from flowing through the inductor 408 and therefore, the antenna 402 is tuned lower. And when the PIN diode 406 is on, or forward biased, antenna signals are able to flow through the inductor 408 and therefore, the antenna 402 is tuned higher.

According to one aspect, the inductance value Lsw of the inductor 408 may be specifically configured to match the low frequency response of the antenna 402, such as, e.g., the LTE low bands. For example, in one embodiment, the higher operational frequencies include the LTE band 5, and the lower operational frequencies include the LTE bands 12, 13, and/or 17. Thus, when the PIN diode switch 406 is on, the antenna 402 is tuned to LTE band 5, and when the PIN diode switch 406 is off, the antenna 402 is tuned to the lower LTE bands 12, 13, and/or 17. In another embodiment, the higher operational frequencies include the LTE band 13, and the lower operational frequencies include the LTE bands 12 and 17. Thus, when the PIN diode switch 406 is off, the antenna 402 is tuned to LTE band 13, and when the PIN diode switch 406 is on, the antenna 402 is tuned to the lower LTE bands 12 and 17. According to some aspects, the antenna 402 may also be tuned to higher frequency bands (such as, e.g., the LTE high bands) by adding, for example, capacitors (not shown) to the circuit 400.

Figure 5:
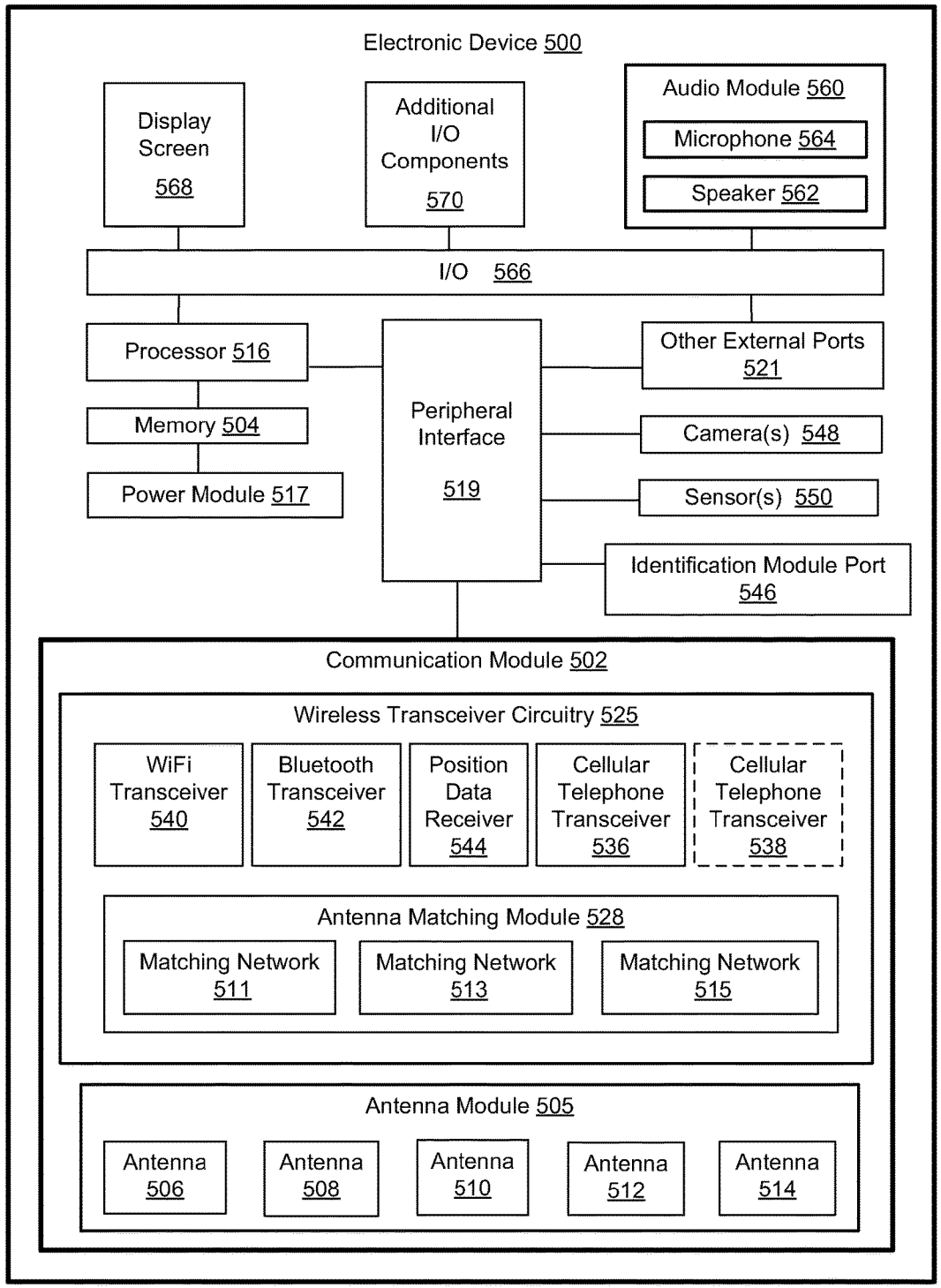
FIG. 5 is a block diagram of an example electronic device including a plurality of antennas and wireless communication circuitry in accordance with some embodiments.

Referring now to FIG. 5, shown is an example electronic device 500 in which some embodiments may be implemented. The electronic device 500 can include a processor 516, a memory 504 (e.g., hard drives, flash memory, MicroSD cards, and others), a power module 517 (e.g., batteries, fuel cells, wired or wireless charging circuits, etc.), a peripheral interface 519, and one or more external ports 521 (e.g., Universal Serial Bus (USB), HDMI, Firewire, and/or others). The memory 504 can have a distributed architecture where various components are situated remote from one another, but are still accessed by the processor 516. These other components may reside on devices located elsewhere on a network or in a cloud arrangement.

The electronic device 500 can further include a communication module 502 (e.g., similar to wireless communication circuitry 202) coupled to the peripheral interface 519. The communication module 502 may include wireless transceiver circuitry 525 and an antenna module 505. According to some embodiments, the antenna module 505 may include one or more of antennas 506, 508, 510, 513, and 515 (e.g., similar to antenna structures 106, 108, 110, 112, and 114). The communication module 502 may further include an antenna matching module 528. According to some embodiments, the antenna matching module 528 may include one or more of antenna matching networks 511, 513, and 515 (e.g., similar to antenna matching circuitry 211, 213, 215) that may be respectively coupled to antennas 506, 508, and 510. The number of antenna matching networks may depend on the number of antennas and therefore, the communication module 502 may include additional matching networks (not shown) for one or more of the antennas 513 and 515.

The wireless transceiver circuitry 525 can include one or more transceivers functioning in accordance with IEEE standards, 3GPP standards, or other standards, and configured to receive and transmit data via the one or more external ports 521. The wireless transceiver circuitry 525 may include one or more WWAN transceivers (such as, e.g., cellular telephone transceivers 536 and 538) configured to communicate with a wide area network, including one or more cell sites or base stations to communicatively connect the electronic device 500 to additional devices or components. Further, the wireless transceiver circuitry 525 can include one or more WLAN and/or WPAN transceivers, such as WiFi transceiver 540 and Bluetooth transceiver 542, that are configured to connect the electronic device 500 to local area networks and/or personal area networks, such as a WiFi network and/or a Bluetooth network. In addition, the wireless transceiver circuitry 525 can include a position data receiver 544 configured to obtain position-related data, such as GPS coordinates, from a position data network, such the GPS system. Still further, the wireless transceiver circuitry 525 can include one or more point-to-point transceivers (not shown) configured to connect the electronic device 500 short-range communication networks, such as, e.g., near-field-communication (NFC) and/or radio frequency identification (RFID).

The electronic device 500 can further include an identification module port 546 for receiving a subscriber-identity-module (SIM) card (e.g., the identification module 218) coupled to the electronic device 500. The SIM card may be removable or permanent and may include information identifying a wireless communication carrier, such as the carrier with which the user has service. The electronic device 500 may also support insertion of multiple SIM cards. Information read from the active SIM card may be sent to a control module included in the processor 516 (e.g., the control module 216) via the peripheral interface 519, before being sent to the communication module 502. Alternatively, the carrier information may be sent to the communication module 502 first, via the peripheral interface 519. Ultimately, the carrier information is sent to the antenna matching module 528 to configure the switch positions of the matching networks 513 and 515 based on the operating bands associated with the present carrier, as discussed above.

The electronic device 500 may also include a camera 548 for capturing images and/or video; one or more sensors 550, such as, for example, accelerometers, gyroscopic sensors (e.g., three angular-axis sensors), additional proximity sensors, tilt sensors, and/or other sensors; and an audio module 560 including hardware components such as a speaker 562 for outputting audio and a microphone 464 for receiving audio. In some embodiments, the speaker 562 and the microphone 564 can be piezoelectric components. The electronic device 500 can further include an input/output (I/O) controller 566, a display screen 568, and additional I/O components 570 (e.g., capacitors, keys, buttons, lights, LEDs, cursor control components, haptic components, touch-sensitive components, and others). The display screen 568, the audio module 560, and the additional I/O components 570 may be considered to form portions of a user interface (e.g., portions of the electronic device 500 associated with presenting information to the user and/or receiving inputs from the user). In some embodiments, the display screen 568 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 516 (e.g., working in connection with an operating system) to implement a method for changing an operating band of one or more of a plurality of antennas included in an electronic device, as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 6:
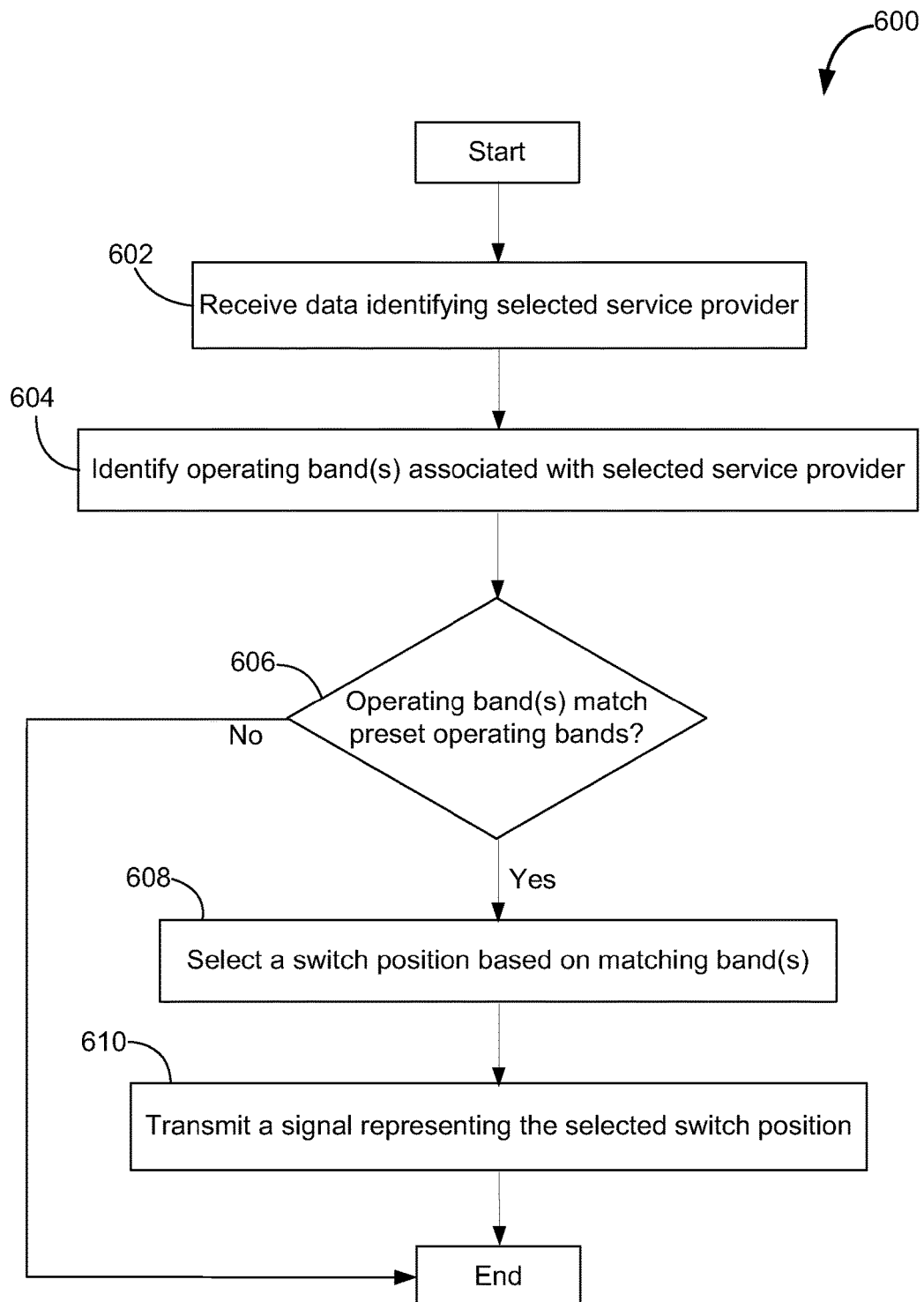
FIG. 6 is a flow diagram depicting control of a switched antenna in accordance with some embodiments.

FIG. 6 is a flowchart of a method 600 for controlling functions associated with changing an operating band of one or more of a plurality of antennas (e.g., the antennas 206, 208, and 210) included in an electronic device (e.g., the electronic device 200). It is understood that the order of the steps of the depicted flowchart of FIG. 6 can be in any order, and certain ones can be eliminated, and/or certain other ones can be added depending upon the implementation.

According to some aspects, the plurality of antennas includes a primary antenna (e.g., the antenna 206) and two secondary antennas (e.g., the antennas 208 and 210). The two secondary antennas may be selectively tunable by two respective antenna matching circuits (e.g., the antenna matching circuits 213 and 215) to one or more preset operating bands, and each of the matching circuits includes a switch (e.g., the switches 220 and 222). According to some embodiments, the primary antenna is configured to transmit and receive signals, at least one of the secondary antennas is configured to only receive signals, and/or at least one of the secondary antennas is configured to transmit and receive signals.

The method 600 begins at step 602, where data identifying a selected one of a plurality of service providers is received. According to one aspect, the data may be received from an identification module (e.g., the identification module 218) coupled to the wireless communication circuitry. In other aspects, the data may be received from a control module (e.g., the control module 216) coupled to the wireless communication circuitry. In one aspect, the data may be provided to the control module by the identification module. The identification module may be a subscriber-identity-module (SIM) card that identifies the service provider currently provided wireless communication service to the electronic device.

At step 604, based on the service provider data received in step 602, at least one operating band associated with the selected service provider is identified. As shown in Table 1, each service provider may be allocated a known set of operating bands. Thus, a table defining the operating bands associated with each service provider (such as, e.g., Table 1) may be accessed to execute the identification process in step 604. For example, if the carrier identification data indicates that the current service provider is AT&T, it follows, based on Table 1, that the electronic device will be able to transmit and/or receive signals in the 700 MHz, 1700 MHz, and/or 1900 MHz frequency bands (e.g., the Americas LTE bands 17, 4, and 2, respectively). In some embodiments, the operating bands determined in step 604 may be sent to the wireless communication circuitry to configure the antennas and/or antenna matching networks accordingly. Alternatively, operating bands may be identified directly without first identifying a service provider.

The method 600 further includes step 606, where it is determined whether the one or more operating bands identified in step 604 overlaps one or more of the preset operating bands associated with the two secondary antennas. Information identifying the preset operating bands may be stored in the electronic device and retrieved for execution of the step 606. According to some embodiments, the preset operating bands include frequencies below 1000 MHz, such as the LTE low bands. For example, the preset operating bands may include the 700 MHz frequency bands (e.g., the Americas LTE bands 12, 13, and/or 17) and/or the 850 MHz frequency band (e.g., the Americas LTE band 5). If operating band(s) identified in step 604 do not match the preset operating bands associated with the secondary antennas, a negative determination is made at step 606 and the method 600 ends. If, however, a positive determination is made at step 606, the method 600 continues to step 608. Continuing with the above AT&T example, there is a match between one of the operating bands for AT&T and one of the preset operating bands associated with the secondary antennas, namely the Americas LTE band 17. Therefore, in this example, the method 600 moves to step 608.

At step 608, a switch position is selected for each of the switches included in the antenna matching circuits, based on the matching one or more preset operating bands. In some aspects, each switch has two selectable states, and each selectable state is associated with one or more of the preset operating bands. A table defining the values associated with each state of each switch (such as Table 2) may be stored in the electronic device and accessed during execution of step 608. Continuing with the above AT&T example, because the matching operating band is LTE band 17, a switch position is selected based on the LTE band 17. For example, referring back to the embodiment of FIG. 2, an "off" switch position is selected for each of the switches 220 and 222 to enable the antennas 208 and 210 to operate in the LTE band 17.

From step 608, the method 600 continues to step 610, where a signal representing the selected switch positions is transmitted to the corresponding antenna matching circuits, thereby controlling a current operating band of each of the two secondary antennas. In embodiments where the control module, and/or the processor in which the control module resides, executes the method 600, the signal may be a control signal from the control module. In some aspects, the control signal may include an instruction to each of the antenna matching circuits coupled to the secondary antennas to either change the switch state for the included switch or make no change to the switch state. In other aspects, the control signal may include a value (e.g., "0" or "1") that corresponds to a certain switch state (e.g., "off" or "on," respectively). For example, continuing the above AT&T example, the control signal may include a "0" value for each of the switches 220 and 222, indicating that both of the switches should move to the off position. If, for example the switch 222 was already in the off position prior to commencement of the method 600, then no changes will be made to the switch 222 in response to the control signal. The method 600 may end upon transmission of the switch signal(s).

As should be apparent, the techniques disclosed herein provide a single, universal antenna module that is pre-optimized for several operating bands and can be selectively optimized for certain sets of operating bands based on a selected switch position. According to one aspect, the universal antenna module includes a non-switched antenna that can operate in one or more high frequency bands and/or one or more low frequency bands, such as, for example, the Americas LTE bands 1, 2, 3, 4, 5, 7, 8, 25, and/or 41. The universal antenna module further includes at least two switched antennas coupled to antenna matching networks that can operate in one of two selectable states, and each of these operating states corresponds to selection of one or more low frequency bands, such as, for example, the Americas LTE bands 5, 12, 13, and/or 17. In one aspect, the switched antennas also can operate in one or more high frequency bands, irrespective of the selected switch state, to support or lessen the burden on the non-switched antenna. In the above manner, the universal antenna module can provide coverage for all Americas LTE bands.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless communication circuitry configured to operate in a plurality of frequency bands, pass signals to, and receive signals from, a plurality of antenna structures arranged in a preset configuration, comprising:
   a first antenna matching circuit configured to tune a first antenna structure to either one of a first subset of the plurality of frequency bands or a second subset of the plurality of frequency bands, the first subset including multiple low frequency pairs of uplink and downlink frequency bands and the second subset including a single high frequency pair of uplink and downlink frequency bands;
   a first switch included in the first antenna matching circuit, the first switch having two selectable states respectively associated with the first subset and the second subset;
   a second antenna matching circuit configured to tune a second antenna structure to either one of a third subset of the plurality of frequency bands or a fourth subset of the plurality of frequency bands, the third subset including multiple high frequency pairs of uplink and downlink frequency bands and the fourth subset including a single low frequency pair of frequency bands;
   a second switch included in the second antenna matching circuit, the second switch having two selectable states respectively associated with the third subset and the fourth subset; and
   a third antenna matching circuit configured to tune a third antenna structure to a fifth subset of the plurality of frequency bands,
   wherein the selected state of each switch is based on a selected one of a plurality of service providers, each service provider being associated with the fifth subset and at least one of the first subset, the second subset, the third subset, or the fourth subset.

2. The wireless communication circuitry of claim 1, wherein the first and second subsets and the third and fourth subsets include common spectral portions of at least one Americas Long Term Evolution (LTE) band.

3. The wireless communication circuitry of claim 2, wherein the common spectral portions are designated for receiving signals.

4. The wireless communication circuitry of claim 2, wherein the fifth subset includes the at least one Americas LTE band.

5. The wireless communication circuitry of claim 1, wherein the fourth subset includes two Americas Long Term Evolution (LTE) bands having at least partially overlapping spectrum allocations.

6. The wireless communication circuitry of claim 1, wherein the third subset includes one or more Americas Long Term Evolution (LTE) bands that are spectrally adjacent to one or more Americas LTE bands included in the fourth subset.

7. The wireless communication circuitry of claim 6, wherein the second subset includes a spectral portion of each of the spectrally adjacent Americas LTE bands.

8. The wireless communication circuitry of claim 7, wherein the spectral portion included in the second subset are designated for receiving signals.

9. The wireless communication circuitry of claim 1, wherein the first switch is a diode switch.

10. The wireless communication circuitry of claim 9, wherein the first switch is in series with respect to the first antenna structure.

11. The wireless communication circuitry of claim 1, wherein the second switch is a micro-electro-mechanical system switch.

12. The wireless communication circuitry of claim 11, wherein the second switch is in series with respect to the second antenna structure.

13. A method for changing an operating band of one or more of a plurality of antennas included in an electronic device, the plurality of antennas including a primary antenna and two secondary antennas, the two secondary antennas being selectively tunable by two respective antenna matching circuits to one or more preset operating bands and each of the two antenna matching circuits including a switch, the method comprising:
receiving data identifying at least one operating band associated with a service provider;
determining whether the at least one operating band overlaps one or more of the preset operating bands;
if a positive determination is made, selecting a switch position for each of the switches based on the overlapping one or more preset operating bands, each switch having two selectable states including a first selectable state including multiple pairs of uplink and downlink frequency bands associated with two or more of the preset operating bands and a second selectable state including a single pair of uplink and downlink frequency bands associated with one of the preset operating bands; and
transmitting a signal representing the selected switch position to the respective antenna matching circuits, thereby controlling a current operating band of each of the two secondary antennas.

14. The method of claim 13, wherein the data is received upon coupling an identification module to the electronic device.

15. The method of claim 13, wherein the primary antenna is configured to transmit and receive signals.

16. The method of claim 13, wherein at least one of the secondary antennas is configured to only receive signals.

17. An electronic device, comprising:
an arrangement of antenna structures configured to transmit and/or receive signals within a plurality of frequency bands, the antenna structures including a first antenna structure, a second antenna structure, and a third antenna structure; and
wireless communication circuitry configured to operate in the plurality of frequency bands, pass the signals to, and receive the signals from, the antenna structures, the wireless communication circuitry including:
a first antenna matching circuit configured to tune the first antenna structure to at least one frequency band included in either of a first subset of the plurality of frequency bands or a second subset of the plurality of frequency bands, the first antenna matching circuit including a first switch with two selectable states respectively associated with the first subset and the second subset, the first subset including multiple low frequency pairs of uplink and downlink frequency bands and the second subset including a single high frequency pair of uplink and downlink frequency bands;
a second antenna matching circuit configured to tune the second antenna structure to at least one frequency band included in either of a third subset of the plurality of frequency bands or a fourth subset of the plurality of frequency bands, the second antenna matching circuit including a second switch with two selectable states respectively associated with the third subset and the fourth subset, the third subset including multiple high frequency pairs of uplink and downlink frequency bands and the fourth subset including a single low frequency pair of frequency bands; and
a third antenna matching circuit configured to tune the third antenna structure to at least one frequency band included in a fifth subset of the plurality of frequency bands,
wherein the selected state of each switch is based on a selected one of a plurality of service providers, each service provider being associated with at least one of the first subset, the second subset, the third subset, or the fourth subset.

18. The electronic device of claim 17, further comprising a port for connecting an identification module, the identification module including data indicating the selected service provider.

19. The electronic device of claim 17, wherein the plurality of frequency bands includes at least Americas Long Term Evolution (LTE) Bands 5 and 13, at least one of Americas LTE Bands 12 or 17, and one or more of Americas LTE Bands 1, 2, 3, 4, 7, 8, 25, 26, or 41.

20. The electronic device of claim 19, wherein the first subset includes at least a spectral portion of Americas LTE Band 5.

21. The electronic device of claim 19, wherein the second subset includes a spectral portion of Americas LTE Band 13 and a spectral portion of at least one of Americas LTE Bands 12 or 17.

22. The electronic device of claim 19, wherein the third subset includes at least Americas LTE Band 13.

23. The electronic device of claim 19, wherein the fourth subset includes at least one of Americas LTE Bands 12 or 17.

24. The electronic device of claim 19, wherein the fifth subset includes at least Americas LTE Band 5 and one or more of Americas LTE Bands 1, 2, 4, or 25.

25. The electronic device of claim 17, further comprising a first end and a second end, wherein the second antenna structure and the third antenna structure are arranged adjacent to the second end.

26. The electronic device of claim 25, wherein the first antenna structure is arranged adjacent to the first end.

27. The electronic device of claim 17, further comprising a first side and a second side, wherein the first antenna structure and the second antenna structure are arranged adjacent to the first side.

28. The electronic device of claim 27, wherein the third antenna structure is arranged adjacent to the second side.

* * * * *